US 9,747,300 B2

(12) United States Patent
Velummylum et al.

(10) Patent No.: US 9,747,300 B2
(45) Date of Patent: Aug. 29, 2017

(54) LOCAL NETWORKED STORAGE LINKED TO REMOTE NETWORKED STORAGE SYSTEM

(75) Inventors: Piragash Velummylum, Seattle, WA (US); Johanna S. Olson, Bellevue, WA (US); Korwin J. Smith, Seattle, WA (US); James H. Wood, Seattle, WA (US); Christopher G. Emery, Seattle, WA (US); Wenlin Ma, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 1208 days.

(21) Appl. No.: 13/161,099

(22) Filed: Jun. 15, 2011

(65) Prior Publication Data

US 2012/0324040 A1   Dec. 20, 2012

(51) Int. Cl.
   *G06F 15/16* (2006.01)
   *G06F 17/30* (2006.01)

(52) U.S. Cl.
   CPC ............................ *G06F 17/30212* (2013.01)

(58) Field of Classification Search
   None
   See application file for complete search history.

(56) References Cited

U.S. PATENT DOCUMENTS 5,758,360 A    5/1998  Zbikowski et al.
6,959,122 B2 * 10/2005  McIntyre ............... 707/999.202
7,197,632 B2 *  3/2007  Rao et al. .................... 709/220
7,739,540 B2 *  6/2010  Akutsu et al. .................. 714/3
2002/0095547 A1  7/2002  Watanabe et al.
2002/0196986 A1 12/2002  McIntyre
2006/0159109 A1 *  7/2006  Lamkin et al. ............... 370/401
2008/0155082 A1  6/2008  Ohtani et al.

(Continued)

FOREIGN PATENT DOCUMENTS

CN    1746855 A     3/2006
CN    101174197 A   5/2008
JP    2007-056787   3/1995

(Continued)

OTHER PUBLICATIONS

International Search Report and Written Opinion, dated Aug. 10, 2012 for PCT/US12/41334.

(Continued)

*Primary Examiner* — Jeffrey R Swearingen
(74) *Attorney, Agent, or Firm* — Thomas|Horstemeyer, LLP (57) ABSTRACT

Disclosed are various embodiments for local networked storage that is linked to a remote networked storage system. In a client application, it is determined whether a local networked storage system is accessible to the client through a local network. A file is sent to the local networked storage system over the local network for storage by the local networked storage system when the local networked storage system is determined to be accessible to the client through the local network. A file is sent to a remote networked storage system over a remote network for storage by the remote networked storage system in association with a user account when the local networked storage system is determined not to be accessible through the local network.

21 Claims, 6 Drawing Sheets (56) References Cited

U.S. PATENT DOCUMENTS

| | | | |
|---|---|---|---|
| 2011/0040814 A1 | 2/2011 | Higgins | |
| 2012/0079091 A1 | 3/2012 | Ermis et al. | |

FOREIGN PATENT DOCUMENTS

| | | |
|---|---|---|
| JP | 2002-324000 | 11/2002 |
| JP | 2004-326162 | 11/2004 |
| JP | 2004326162 A | 11/2004 |
| JP | 2005-322004 | 11/2005 |
| JP | 2005322004 A | 11/2005 |
| JP | 2006-065622 | 3/2006 |
| JP | 2006065622 A | 3/2006 |
| JP | 2007521541 A | 8/2007 |
| JP | 2008-158711 | 7/2008 |

OTHER PUBLICATIONS

U.S. Appl. No. 13/036,539 entitled "Metadata-Based File System," filed Feb. 28, 2011.
U.S. Appl. No. 13/074,325 entitled "Local Storage Linked to Networked Storage System," filed Mar. 29, 2011.
Office Action for CA application 2,836,151 mailed May 28, 2015.
Office Action for CN 201280029135.X mailed Jul. 5, 2016.
English Translation of the Office Action for CN 201280029135.X mailed Jul. 5, 2016.
English Translation of CN 1746855 published on Mar. 15, 2006.
English Translation of CN 101174197 published on May 7, 2008.
Office Action from the Canadian Intellectual Property Office for CA 2,836,151 mailed May 19, 2016.
"Cache" From Wikipedia, the free encyclopedia (Redirected from Cache (computing)), online document retrieved through Web Archive, Jun. 6, 2008 (Jun. 6, 2008) [retrieved on May 17, 2016 (May 17, 2016) from: http://web.archive.org/web/20080606003542/http://en.wikipedia.org/wiki/Cache_(computing).
Japanese Patent Application JP2014-512194 filed on Jun. 7, 2012, Notice of Rejection dated Nov. 26, 2014.
Japanese Patent Application JP2014-512194 filed on Jun. 7, 2012, Response to Notice of Rejection dated Feb. 27, 2015.
Japanese Patent Application JP2014-512194 filed on Jun. 7, 2012, Decision of Refusal dated Apr. 27, 2015.
Japanese Patent Application JP2014-512194 filed on Jun. 7, 2012, Notice of Allowance dated Nov. 10, 2015.
European Patent Application EP12799892.0 filed on Jun. 7, 2012, Extended European Search Report dated Jul. 21, 2015.
European Patent Application EP12799892.0 filed on Jun. 7, 2012, Response to Extended European Search Report dated Feb. 7, 2016.
Japanese Patent Application JP2015-169091 filed on Jun. 7, 2012, Notice of Rejection dated Oct. 28, 2016.
JP Office Action for JP 2015/169091 dated Oct. 11, 2016. Summary translation provided.
Canadian Office Action dated Apr. 27, 2017.

* cited by examiner

LOCAL NETWORKED STORAGE LINKED TO REMOTE NETWORKED STORAGE SYSTEM

BACKGROUND

Users may wish to store data with networked storage systems that provide storage guarantees to ensure that data is safe from fires and other hazards. Unfortunately, it can be difficult for some users to interact with networked storage systems due to lack of computing skills and other problems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to remote storage of data files according to a utility computing model. A networked file system may be employed to provide access to files stored in a cloud computing resource comprising a networked plurality of computing devices. In some embodiments, the networked file system may correspond to a virtual file system where the actual data objects of the files are stored in a separate data storage system. A metadata service may be used to associate metadata with the files, thereby facilitating searches of the files using the metadata. By storing files in such a networked file system, users may access the files from any computing device that has network connectivity.

According to various embodiments, a network-attached storage device is used to provide locally accessible storage for a remote networked storage system for a client device. By accessing a network-attached storage device connected to a local network, the client may experience faster performance than by accessing the remote networked storage system directly. However, because the network-attached storage device is backed by the remote networked storage system, the data may be more widely accessible than data that is only locally stored. Further, the data may be protected by reliability and/or availability guarantees of the remote networked storage system.

When a client stores a file to the network-attached storage device, the file is ultimately stored in the remote networked storage system which may comprise a cloud storage system, where a listing of the files stored in the remote networked storage system may be maintained in the network-attached storage device. A subset of the files stored in the remote networked storage system that have been most recently accessed may also be stored in the network-attached storage device. An application may be executed in association with the network-attached storage device that serves to manage the storage of files on both the network-attached storage device and in the remote networked storage system. In addition, other functionality is discussed with respect to other embodiments. In the following discussion, first a description of the physical nature of the various components is provided, followed by a discussion of the operation of the same.

Figure 1:
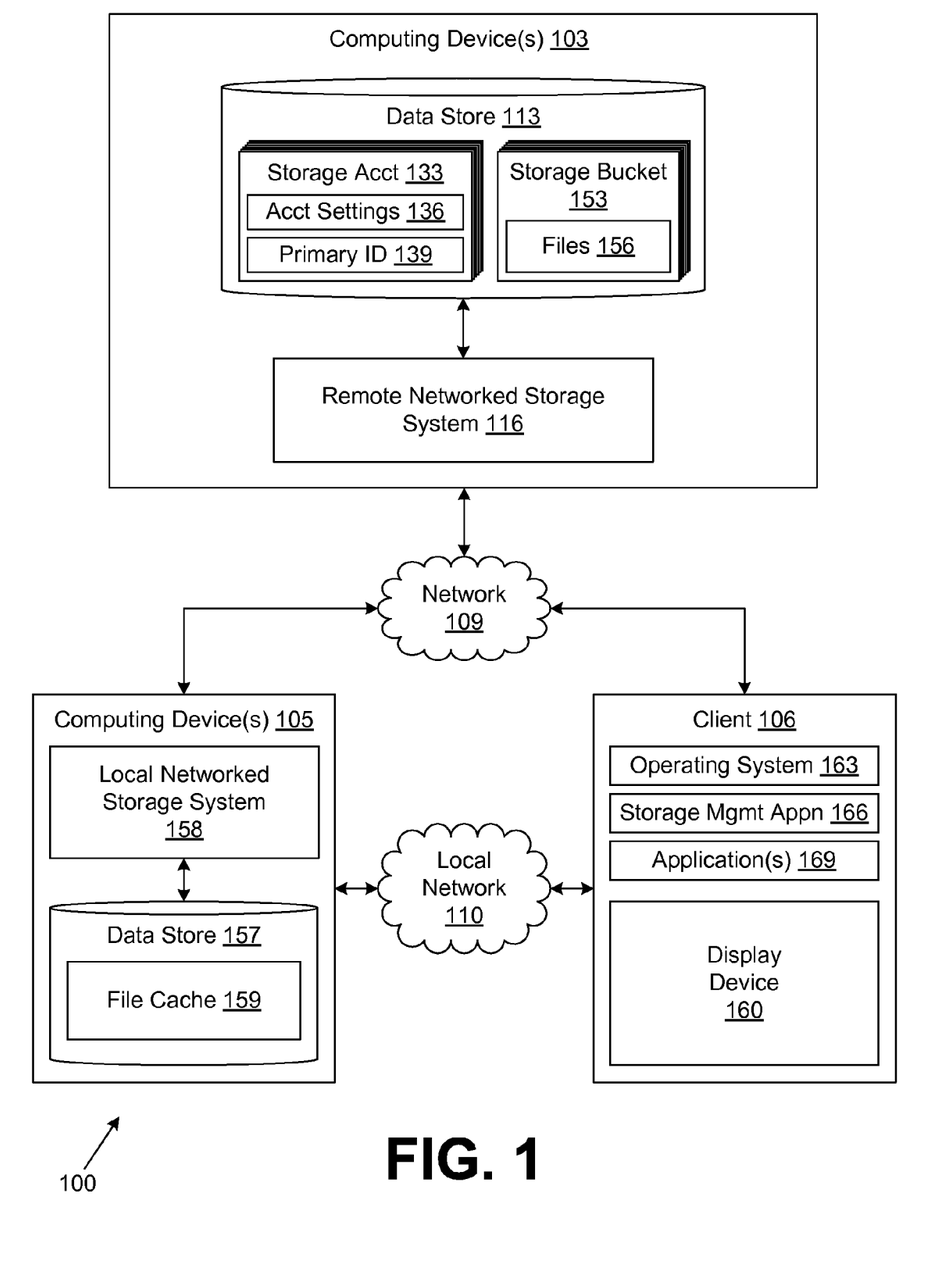
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 105, and one or more clients 106 in data communication by way of a network 109. The network 109 includes, for example, the Internet, intranets, extranets, wide area networks (WANs), local area networks (LANs), wired networks, wireless networks, or other suitable networks, etc., or any combination of two or more such networks.

In addition, the client 106 is in data communication with the computing device 105 by way of a local network 110. The local network 110 may correspond to a home-based network, a private network, a wired network, a wireless network, and/or a combination of wired and wireless networks. The local network 110 may be accessible from the network 109 through a virtual private network or other gateway. The computing device 105 and the client 106 may be coupled to the network 109 through a gateway of the local network 110 such as a proxy, a network-address translation device, a firewall, a router, etc. In various embodiments, the local network 110 may provide much faster connectivity than the network 109. In comparison to the local network 110, the network 109 may be considered to be a remote network 109.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores 113 as can be appreciated. The data stored in the data store 113, for example, is associated with the operation of the various applications and/or functional entities described below.

The components executed on the computing device 103, for example, include a remote networked storage system 116 and other applications, services, processes, systems, engines, or functionality not discussed in detail herein. The remote networked storage system 116 is executed to maintain a file hierarchy of files and folders in networked or metadata-based file systems for users. To this end, the remote networked storage system 116 may support various file-related operations such as, for example, creating files, deleting files, modifying files, setting permissions for files, downloading files, and/or other operations. The remote networked storage system 116 may be configured to serve up data addressed by uniform resource locator (URL) via hypertext transfer protocol (HTTP).

A metadata service may be executed in association with or as part of the remote networked storage system 116 to maintain metadata items in association with files. To this end, such a metadata service may support various operations such as, for example, creating metadata items, deleting metadata items, retrieving metadata items, searching on metadata items, and/or other operations. The metadata service may also implement one or more searchable indices of the metadata items. It is noted that the networked file system associated with each user storage account in the remote networked storage system 116 may be a metadata-based file system such as that described by U.S. patent application Ser. No. 13/036,539 entitled "METADATA-BASED FILE SYSTEM," which was filed on Feb. 28, 2011 and is incorporated herein by reference in its entirety.

Various applications may be provided that correspond to hosted applications that may access the data stored in the networked file system. Such applications may, for example, have a web-based interface and may serve up network pages, such as web pages or other forms of network content, to facilitate user interaction. Other applications may be internal applications and may not have a web-based interface. Non-limiting examples of such applications may include a photo organizing tool, a music file organizer and playback tool, a word processor, a spreadsheet, an email application, and so on.

The data stored in the data store 113 includes, for example, storage accounts 133. Associated with each storage account 133 are account settings 136, a primary identifier 139, and potentially other information. The primary identifier 139 may comprise, for example, an email address, a string of characters, or other type of identifier as will be described. Associated with each storage account 133 are one or more storage buckets 153 in which various files 156 are stored on the behalf of the user who holds the storage account 133 as will be described.

The storage account 133 may include information about a user with which the storage account 133 is associated. Such information may comprise, for example, name, address, payment instruments, and other information. The account settings 136 may be employed to specify and track various settings and other functionality with respect to a given storage account 133 such as passwords, security credentials, file management permissions, storage quotas and limitations, authorized access applications, billing information, and/or other data. The primary identifier 139 is an identifier associated with the holder of the respective storage account 133. Such a user may be deemed the primary holder of the account and can control its usage.

The computing device 105 may comprise a network-attached storage device. To this end, the computing device 105 may comprise, for example, a server computer or any other system providing computing capability and data storage capability. Alternatively, a plurality of computing devices 105 may be employed that are arranged, for example, in one or more computer banks or other arrangements. For purposes of convenience, the computing device 105 is referred to herein in the singular. Even though the computing device 105 is referred to in the singular, it is understood that a plurality of computing devices 105 may be employed in the various arrangements as described above.

Various applications and/or other functionality may be executed in the computing device 105 according to various embodiments. Also, various data is stored in a data store 157 that is accessible to the computing device 105. The data store 157 may be representative of a plurality of data stores 157 as can be appreciated. The data stored in the data store 157, for example, is associated with the operation of the various applications and/or functional entities described below. In some embodiments, the data store 157 may employ a redundant array of independent disks (RAID), clustering, and/or other technologies to increase reliability.

The components executed on the computing device 105, for example, include a local networked storage system 158 and other applications, services, processes, systems, engines, or functionality not discussed in detail herein. The local networked storage system 158 is executed to maintain a cache of a file hierarchy of files and folders in networked or metadata-based file systems of the remote networked storage system 116 for users. To this end, the local networked storage system 158 may support various file-related operations such as, for example, creating files, deleting files, modifying files, setting permissions for files, downloading files, and/or other operations. The local networked storage system 158 may be configured to serve up data addressed by URL via HTTP.

The data stored in the data store 157 includes, for example, a file cache 159. The file cache 159 corresponds to a full or partial mirror of the data available for the user in the files 156 of the remote networked storage system 116. The file cache 159 may be updated periodically or on-demand in response to a user accessing data through the local networked storage system 158. The file cache 159 may also include metadata and/or other information from the file system of the user in the remote networked storage system 116.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, electronic book readers, smart phones, or other devices with like capability. The client 106 may include a display device 160 such as a liquid crystal display (LCD), or other type of display device as can be appreciated.

The client 106 may be configured to execute an operating system 163, a storage management application 166, and other applications 169 such as email applications, instant message applications, a browser, word processors, spreadsheets, drawing applications, and/or other applications. In various embodiments, the storage management application 166 may correspond to client-side executable code provided in conjunction with a browser-based interface served up by the remote networked storage system 116 and/or the local networked storage system 158.

Next, a general description of the operation of the various components of the networked environment 100 is provided. To begin, a user may configure a storage account 133 on the computing device 103. One or more storage buckets 153 may be assigned to the user with the primary identifier 139 of the user. Once a storage account 133 is configured, the user may begin storing files 156 on the remote networked storage system 116.

Direct use of the remote networked storage system 116 by the client 106 is first described. In one example, the user may upload a file 156 to the remote networked storage system 116 over the network 109 by way of a browser-based interface. In another example, the storage management application 166 executed in the client 106 may be configured to make the remote networked storage system 116 appear to be a local storage device. In such an example, the user may simply store a file 156 on the remote networked storage system 116 as if it were any local storage device, and the storage management application 166 handles the uploading in the background. In yet another example, the user may purchase a file 156 or otherwise generate a file 156 by way of an application executed in the computing device 103, and the application stores the file 156 in the storage bucket 153 for the user.

Once files 156 are available in the remote networked storage system 116, the user may begin reading the files and/or modifying metadata that describes the files. In one example, the user may access the remote networked storage system 116 through a browser-based interface and download or modify files 156 through such an interface. In another example, the user may access the remote networked storage system 116 through the storage management application 166 as if it were any locally accessible storage device. For instance, the operating system 163 may be configured to present the remote networked storage system 116 as if it were a mounted drive or file system in the client 106. The files 156 may be downloaded, organized by the user into directories, renamed, modified, and so on.

Because storage of the files 156 is maintained by the remote networked storage system 116, the files 156 may be associated with a service-level agreement of the operator of the computing device 103. Such a service-level agreement may comprise, for example, reliability, availability, and/or other guarantees. Further, the files 156 may be accessed by diverse clients 106 of the user which may be on different portions of the network 109. For example, the clients 106 of the user may comprise a desktop computer connected to the network 109 through a home broadband connection, a laptop computer connected to the network 109 through a shared Wi-Fi connection at a public location, a smart phone connected to the network 109 through a cellular data network, and so on.

The performance of the remote networked storage system 116 may be enhanced through the use of a computing device 105 that offers network-attached storage to clients 106 connected to the local network 110. In various embodiments, the computing device 105 corresponds to any standalone network-attached storage device that typically remains online regardless of the state of the clients 106 on the local network 110. However, it is understood that the computing device 105 may correspond to any computer system that offers networked file storage to clients 106 of the local network 110. The local networked storage system 158 of the computing device 105 may be mountable and/or otherwise appear to be locally accessible to the client 106 when on the local network 110.

The local networked storage system 158 may support faster access by the client 106 than the remote networked storage system 116. As a non-limiting example, the local network 110 may correspond to a 1000 megabit-per-second Ethernet network, while the connection of the client 106 to the network 109 may correspond to a 768 kilobit-per-second digital subscriber line (DSL) Internet connection. In addition, the local networked storage system 158 may support more storage for the user than the remote networked storage system 116. As a non-limiting example, the local networked storage system 158 may support three terabytes of storage, while the remote networked storage system 116 may offer five gigabytes of storage for free to the user, with additional storage available to the user for a recurring fee.

Accordingly, when the local networked storage system 158 is accessible to the client 106 by way of the local network 110, the storage management application 166 may be configured to route some or all file 156 requests to the local networked storage system 158 instead of the remote networked storage system 116. The files 156 may or may not be in the file cache 159. If the current version of the file 156 is stored in the file cache 159, the local networked storage system 158 may simply return the cached file 156 to the client 106 over the local network 110 in response to a read request.

If the client 106 requests to read a file 156 that is not in the file cache 159, the local networked storage system 158 may act as a proxy and request the file 156 from the remote networked storage system 116 on behalf of the client 106. In various embodiments, the file 156 may be returned to the client 106 by the local networked storage system 158 after being obtained or concurrently in chunks while being obtained. Alternatively, the client 106 may obtain the file 156 independently from the remote networked storage system if the file 156 is not present in the file cache 159. The storage management application 166 may subsequently provide a copy of the file to the local networked storage system 158 to be added to the file cache 159.

With respect to new files 156, writes, modifications, and/or other updates, the local networked storage system 158 may act as a write-through cache for the storage management application 166. When data is updated, the data is stored in the file cache 159 and propagated to the remote networked storage system 116. In one embodiment, the data is stored first in the file cache 159 and then sent to the remote networked storage system 116. In another embodiment, the data is concurrently stored in the file cache 159 and sent by the local networked storage system 158 for storage in the remote networked storage system 116. In various other alternative embodiments, the storage management application 166 may be configured to send the data to the local networked storage system 158 and then send the data to the remote networked storage system 116, send the data to the remote networked storage system 116 and then send the data to the local networked storage system 158, or send the data concurrently to both the local networked storage system 158 and the remote networked storage system 116.

In some embodiments, the local networked storage system 158 may augment the remote networked storage system 116 transparently on the local network 110. To this end, the storage management application 166 may engage in some type of discovery to determine whether the local networked storage system 158 is present. Such discovery may include an application on the client 106 to measure throughput, latency, and/or other network performance benchmark parameters to determine if connecting to the local networked storage system 158 would provide a performance benefit over connecting to the remote networked storage system 116. As an alternative, the storage management application 166 may be explicitly configured by the user to use the local networked storage system 158. As another alternative, the storage management application 166 may be configured by the remote networked storage system 116 to use the local networked storage system 158 when the remote networked storage system 116 detects that the local networked storage system 158 and the storage management application 166 are executed by devices connected to the same local network 110.

In one embodiment, a user interface including a listing of files 156 generated by the local networked storage system 158 may indicate whether each file 156 (or directory of files 156) is a cached copy of a file 156 maintained by the remote networked storage system 116 or an original file that is not maintained by the remote networked storage system 116. Further, the user may be able to mark or otherwise control which files 156 are to be maintained in the remote networked storage system 116 as opposed to merely the local networked storage system 158. Such an option may be helpful when the local networked storage system 158 has a larger storage capacity than the remote networked storage system 116. As an example, the user may designate certain important files 156 for inclusion in the remote networked storage system 116 for reliability reasons. As another example, the user may designate certain files 156 that are likely to be accessed by clients 106 not connected to the local network 110 for inclusion in the remote networked storage system 116.

In some cases, clients 106 outside of the local network 110 may access the local networked storage system 158. Such access may be facilitated by a virtual private network, proxy, remote terminal, and/or some other approach. However, a connection of a client 106 to the computing device 105 through the network 109 may be slower than to the computing device 103. The client 106 may prefer to access the remote networked storage system 116 instead of the local networked storage system 158 when access through the local network 110 is unavailable. Nevertheless, in some cases, it may be useful to access the local networked storage system 158 through the network 109, e.g., for data not also stored by the remote networked storage system 116, if the remote networked storage system 116 were unavailable, etc.

In various embodiments, either the local networked storage system 158 or the remote networked storage system 116 may be authoritative for a file 156. It may be preferred that the remote networked storage system 116 be authoritative for reliability, availability, and/or other reasons. If the remote networked storage system 116 is authoritative, the local networked storage system 158 may not acknowledge that an update to a file 156 is complete until the file 156 has been successfully updated in the remote networked storage system 116 as well. By contrast, if the local networked storage system 158 is authoritative, the remote networked storage system 116 may not acknowledge that an update to a file 156 is complete until the file 156 has been updated in the local networked storage system 158 as well. Further, new versions may have to be sent by the local networked storage system 158 directly to clients 106 not on the local network 110 until the updates are propagated to the remote networked storage system 116.

The local networked storage system 158 may cache data from the headers of the files 156 or portions of those files 156 that may be useful in listing the files 156 for access by a user. For example, when a file 156 is a song in MP3 format, a portion of the song may be stored in the file cache 159 to play for a user to determine whether they wish to access the song. Alternatively, other information such as metadata, thumbnails of images, and other data may be included in the file cache 159. In one embodiment, a full mirror of the metadata for the files 156 for the user may be maintained in the file cache 159. In another embodiment, the local networked storage system 158 may query the remote networked storage system 116 for metadata whenever a metadata access or search is performed.

The remote networked storage system 116 and the local networked storage system 158 may also be supplemented by local storage of cached data in the client 106 in some embodiments. Various techniques relating to the use of local storage on the client 106 are described in U.S. patent application Ser. No. 13/074,325 entitled "LOCAL STORAGE LINKED TO NETWORKED STORAGE SYSTEM," which was filed on Mar. 29, 2011 and is incorporated herein by reference in its entirety.

Figure 2A:
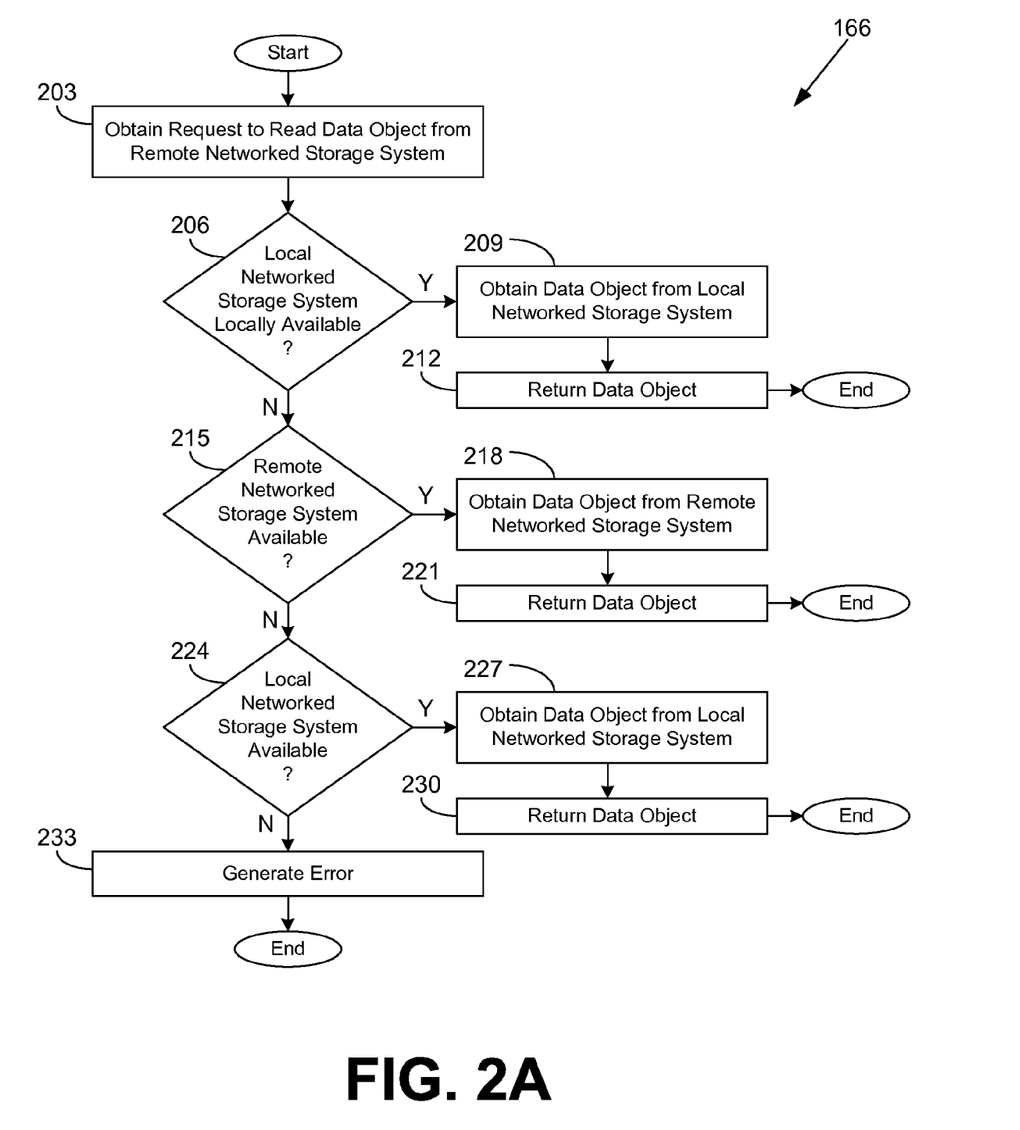
FIGS. 2A and 2B are flowcharts illustrating examples of functionality implemented as portions of a storage management application executed in a client computing device in the networked environment of FIG. 1 according to various embodiments of the present disclosure.

Referring next to FIG. 2A, shown is a flowchart that provides one example of the operation of a portion of the storage management application 166 according to various embodiments. It is understood that the flowchart of FIG. 2A provides merely an example of the many different types of functional arrangements that may be employed to implement the operation of the portion of the storage management application 166 as described herein. As an alternative, the flowchart of FIG. 2A may be viewed as depicting an example of steps of a method implemented in the client 106 (FIG. 1) according to one or more embodiments.

Beginning with box 203, the storage management application 166 obtains a request to read a data object from a remote networked storage system 116 (FIG. 1). Such a request may be generated through a user interface rendered by the storage management application 166 in the client 106. Such a user interface may comprise a network page, a file browser application of the operating system 163 (FIG. 1), an extension of an application 169 (FIG. 1), and/or other types of user interfaces. The user interface may or may not distinguish between files that are stored in both the remote networked storage system 116 and the local networked storage system 158 (FIG. 1) or files that are stored in the remote networked storage system 116 but not the local networked storage system 158.

In box 206, the storage management application 166 determines whether the local networked storage system 158 is locally available. In other words, the storage management application 166 determines whether the local networked storage system 158 may be contacted by the client 106 over the local network 110 (FIG. 1). To this end, the storage management application 166 may engage in a form of discovery and/or execute network performance benchmarks to determine whether the local networked storage system 158 is accessible over the local network 110.

If the local networked storage system 158 is locally available, the storage management application 166 moves to box 209. In box 209, the storage management application 166 obtains the data object from the local networked storage system 158. In box 212, the storage management application 166 returns the data object. Thereafter, the portion of the storage management application 166 ends.

If, instead, in box 206, the storage management application 166 determines that the local networked storage system 158 is not locally available, the storage management application 166 continues from box 206 to box 215. In box 215, the storage management application 166 determines whether the remote networked storage system 116 is available. As a non-limiting example, the storage management application 166 may initiate a network connection, ping, and/or perform another type of outreach to determine whether the remote networked storage system 116 is available. If the remote networked storage system 116 is available, the storage management application 166 moves to box 218 and obtains the data object from the remote networked storage system 116. To this end, the storage management application 166 may provide an indication of a storage account 133 (FIG. 1) such as a primary identifier 139 (FIG. 1) to the remote networked storage system 116. In box 221, the storage management application 166 obtains the data object. Thereafter, the portion of the storage management application 166 ends.

If, instead, the storage management application 166 determines in box 215 that the remote networked storage system 116 is not available, the storage management application 166 continues to box 224. In box 224, the storage management application 166 determines whether the local networked storage system 158 is available even if not over the local network 110, e.g., over the network 109 (FIG. 1), a virtual private network, etc. If the local networked storage system 158 is available, the storage management application 166 proceeds to box 227 and obtains the data object from the local networked storage system 158. In box 230, the storage management application 166 returns the data object. Thereafter, the portion of the storage management application 166 ends.

If the storage management application 166 determines in box 224 that the local networked storage system 158 is not available, the storage management application 166 instead continues to box 233 and generates an error. Alternatively, the storage management application 166 may return a local copy of the data object on the client 106, if such a local copy is available. Thereafter, the portion of the storage management application 166 ends.

Figure 2B:
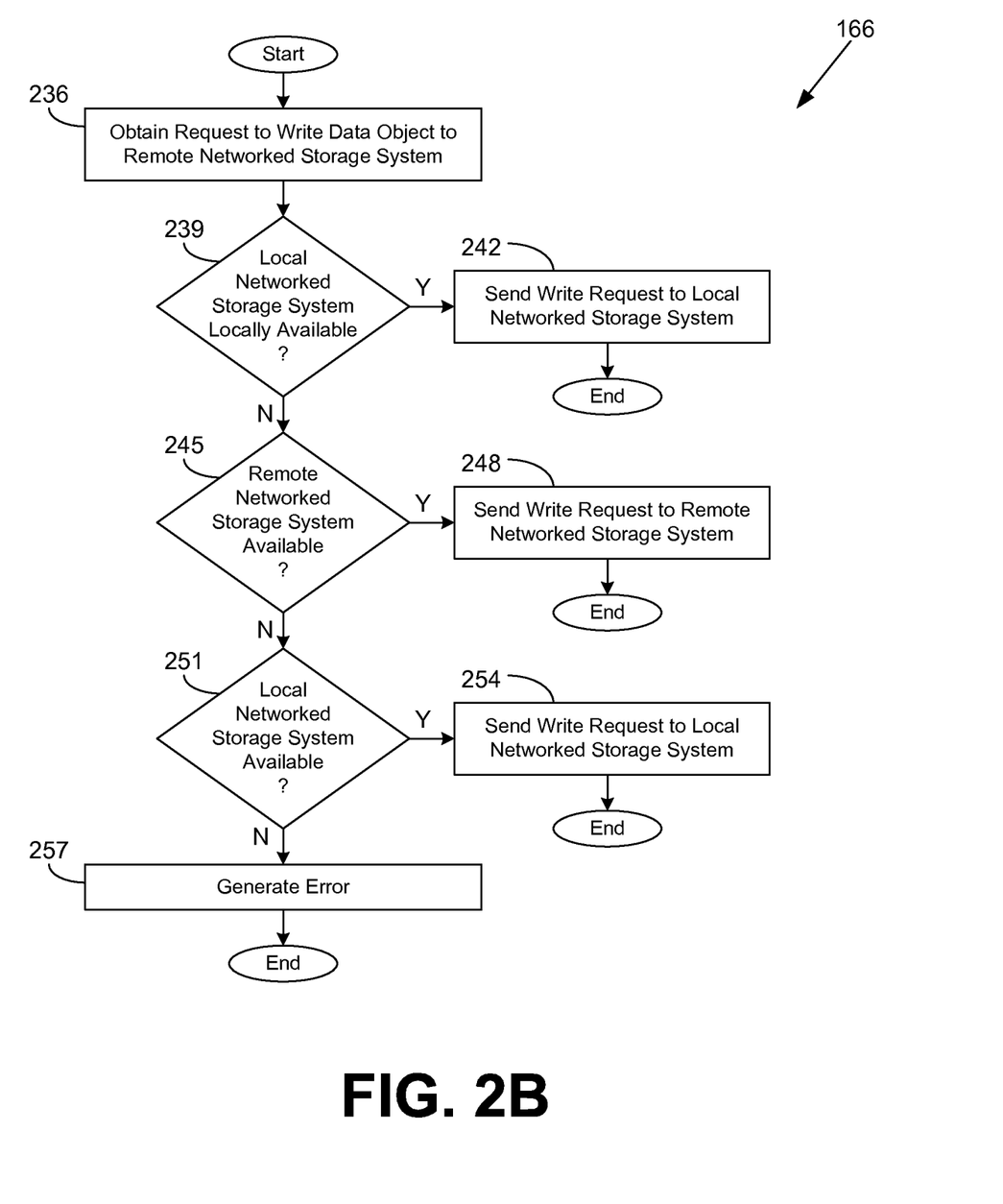

Moving on to FIG. 2B, shown is a flowchart that provides another example of the operation of a portion of the storage management application 166 according to various embodiments. It is understood that the flowchart of FIG. 2B provides merely an example of the many different types of functional arrangements that may be employed to implement the operation of the portion of the storage management application 166 as described herein. As an alternative, the flowchart of FIG. 2B may be viewed as depicting an example of steps of a method implemented in the client 106 (FIG. 1) according to one or more embodiments.

Beginning with box 236, the storage management application 166 obtains a request to write, update, or otherwise modify a data object on the remote networked storage system 116 (FIG. 1). Such a request may be generated through a user interface rendered by the storage management application 166 in the client 106. Such a user interface may comprise a network page, a file browser application of the operating system 163 (FIG. 1), an extension of an application 169 (FIG. 1), and/or other types of user interfaces. The user interface may or may not distinguish between files that are stored in both the remote networked storage system 116 and the local networked storage system 158 (FIG. 1) or files that are stored in the remote networked storage system 116 but not the local networked storage system 158.

In box 239, the storage management application 166 determines whether the local networked storage system 158 is locally available. In other words, the storage management application 166 determines whether the local networked storage system 158 may be contacted by the client 106 over the local network 110 (FIG. 1). To this end, the storage management application 166 may engage in a form of discovery and/or execute network performance benchmarks to determine whether the local networked storage system 158 is accessible over the local network 110.

If the local networked storage system 158 is locally available, the storage management application 166 moves to box 242. In box 242, the storage management application 166 sends the write request to the local networked storage system 158. The storage management application 166 may receive confirmation of a successful write in various embodiments. A synchronization approach may be employed in the local network storage system 158 to make the updated data object globally available. Whether the write is successful may depend on whether the local networked storage system 158 is authoritative for the data object and/or whether the write has been propagated successfully to the remote networked storage system 116. Thereafter, the portion of the storage management application 166 ends.

If, instead, in box 239, the storage management application 166 determines that the local networked storage system 158 is not locally available, the storage management application 166 continues from box 239 to box 245. In box 245, the storage management application 166 determines whether the remote networked storage system 116 is available. As a non-limiting example, the storage management application 166 may initiate a network connection, ping, and/or perform another type of outreach to determine whether the remote networked storage system 116 is available. If the remote networked storage system 116 is available, the storage management application 166 moves to box 248 and sends the write request to the remote networked storage system 116. The storage management application 166 may receive confirmation of a successful write in various embodiments. Whether the write is successful may depend on whether the remote networked storage system 116 is authoritative for the data object. Thereafter, the portion of the storage management application 166 ends.

If, instead, the storage management application 166 determines in box 245 that the remote networked storage system 116 is not available, the storage management application 166 continues to box 251. In box 251, the storage management application 166 determines whether the local networked storage system 158 is available even if not over the local network 110, e.g., over the network 109 (FIG. 1), a virtual private network, etc. If the local networked storage system 158 is available, the storage management application 166 proceeds to box 254 and sends the write request to the local networked storage system 158. The storage management application 166 may receive confirmation of a successful write in various embodiments. A synchronization approach may be employed in the local network storage system 158 to make the updated data object globally available. Whether the write is successful may depend on whether the local networked storage system 158 is authoritative for the data object and/or whether the write has been propagated successfully to the remote networked storage system 116. Thereafter, the portion of the storage management application 166 ends.

If the storage management application 166 determines in box 224 that the local networked storage system 158 is not available, the storage management application 166 instead continues to box 233 and generates an error. Alternatively, the storage management application 166 may write the data object to a local cache on the client 106, if such a local cache is available. Thereafter, the portion of the storage management application 166 ends.

Figure 3A:
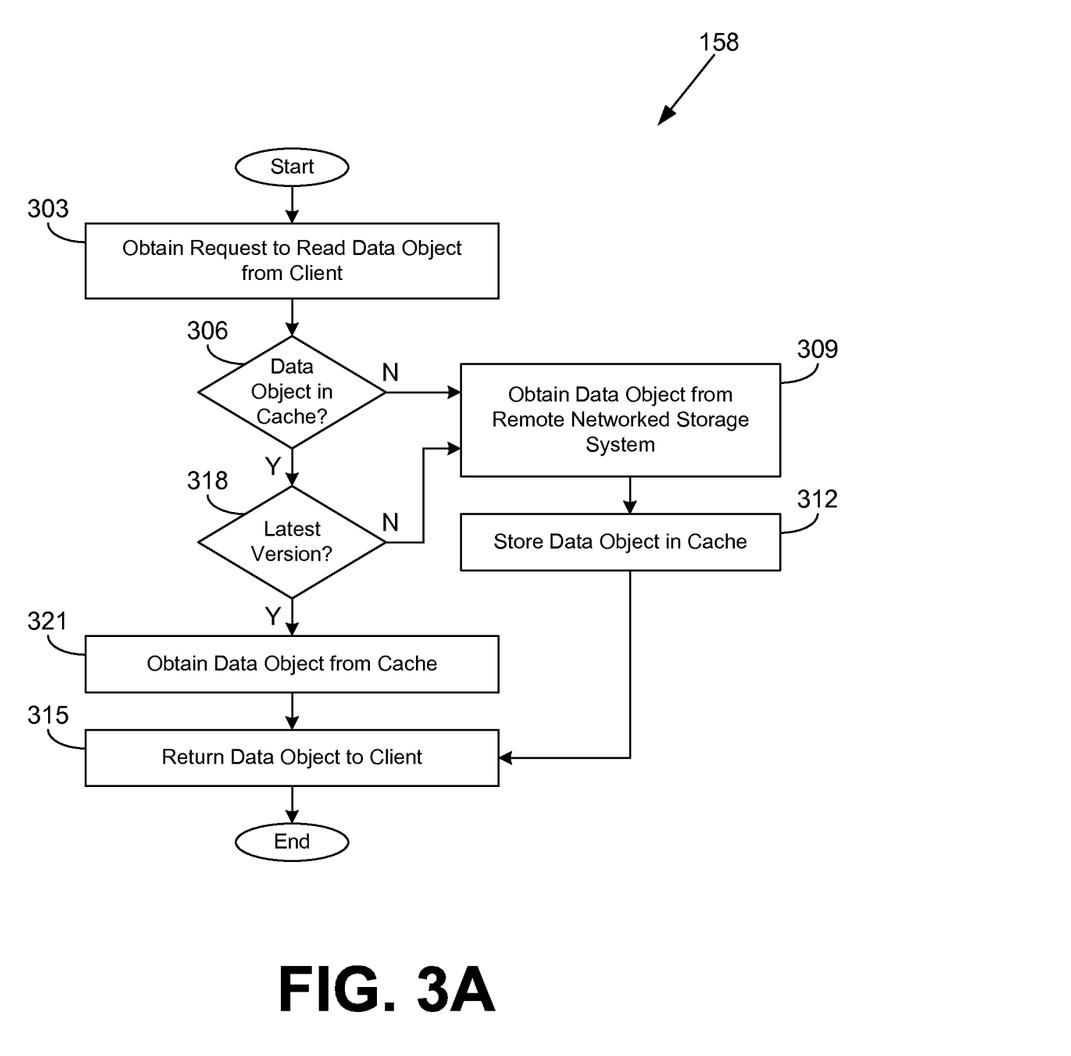
FIGS. 3A and 3B are flowcharts illustrating examples of functionality implemented as portions of a local networked storage system executed in a computing device in the networked environment of FIG. 1 according to various embodiments of the present disclosure.

Turning now to FIG. 3A, shown is a flowchart that provides one example of the operation of a portion of the local networked storage system 158 according to various embodiments. It is understood that the flowchart of FIG. 3A provides merely an example of the many different types of functional arrangements that may be employed to implement the operation of the portion of the local networked storage system 158 as described herein. As an alternative, the flowchart of FIG. 3A may be viewed as depicting an example of steps of a method implemented in the computing device 105 (FIG. 1) according to one or more embodiments.

Beginning with box 303, the local networked storage system 158 obtains a request to read a data object from a storage management application 166 (FIG. 1) executed in a client 106 (FIG. 1). In box 306, the local networked storage system 158 determines the data object is in the file cache 159 (FIG. 1). If the data object is not in the file cache 159, the local networked storage system 158 continues to box 309 and obtains the data object from the remote networked storage system 116 (FIG. 1). In box 312, the local networked storage system 158 stores the data object in the file cache 159. In box 315, the local networked storage system 158 returns the data object to the client 106. In various embodiments, the data object may be returned to the client 106 before being stored in the file cache 159, after being stored in the file cache 159, or concurrently with storage in the file cache 159 as the data object is obtained from the remote networked storage system 116. Thereafter, the portion of the local networked storage system 158 ends.

If, instead, the local networked storage system 158 determines in box 306 that the data object is stored in the file cache 159, the local networked storage system 158 moves to box 318. In box 318, the local networked storage system 158 determines whether the cached copy of the data object corresponds to the latest version of the data object, if the local networked storage system 158 is not authoritative. As a non-limiting example, the local networked storage system 158 may communicate with the remote networked storage system 116 to determine whether a file signature associated with the data object is current. If the cached copy of the data object is not the latest version, the local networked storage system 158 moves to box 309 and obtains the latest version of the data object as described above.

If the local networked storage system 158 determines in box 318 that the copy of the data object stored in the file cache 159 is the latest version, the local networked storage system 158 transitions from box 318 to box 321 and obtains the data object from the file cache 159. Next, in box 315, the local networked storage system 158 returns the data object to the client 106. Thereafter, the portion of the local networked storage system 158 ends.

Figure 3B:
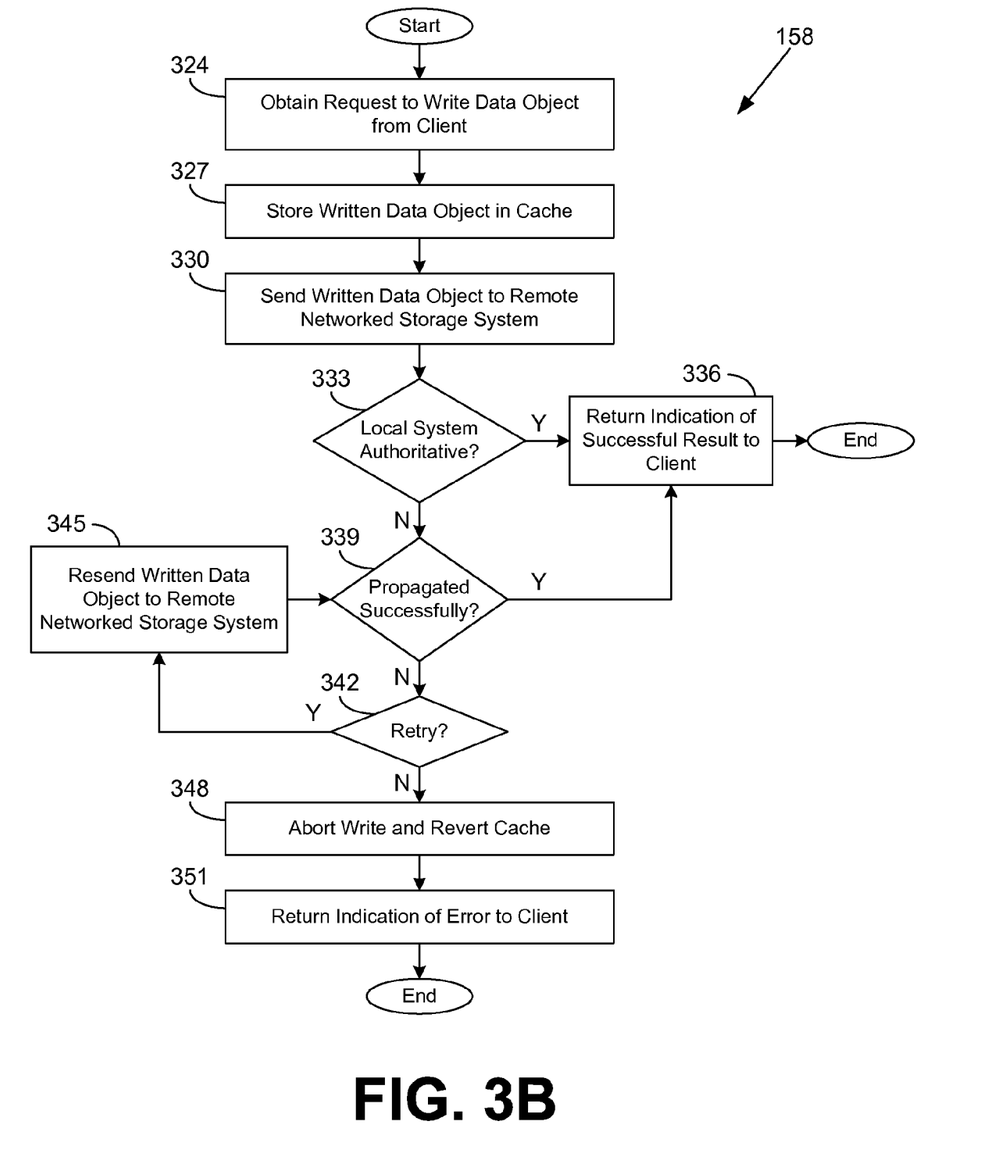

Continuing to FIG. 3B, shown is a flowchart that provides another example of the operation of a portion of the local networked storage system 158 according to various embodiments. It is understood that the flowchart of FIG. 3B provides merely an example of the many different types of functional arrangements that may be employed to implement the operation of the portion of the local networked storage system 158 as described herein. As an alternative, the flowchart of FIG. 3B may be viewed as depicting an example of steps of a method implemented in the computing device 105 (FIG. 1) according to one or more embodiments.

Beginning with box 324, the local networked storage system 158 obtains a request to write a data object from a storage management application 166 (FIG. 1) executed in a client 106 (FIG. 1). Such a request may be a request to write a new data object, update an existing data object, modify the metadata for an existing data object, or perform another type of data modifying operation. In box 327, the local networked storage system 158 stores the written/modified data object in the file cache 159 (FIG. 1). In box 330, the local networked storage system 158 sends the written data object to the remote networked storage system 116 (FIG. 1).

In box 333, the local networked storage system 158 determines whether it is authoritative for the data object. If so, the local networked storage system 158 returns an indication of a successful result to the client 106 in box 336. Thereafter, the portion of the local networked storage system 158 ends.

If the local networked storage system 158 determines in box 333 that it is not authoritative for the data object, the local networked storage system 158 instead moves from box 333 to box 339. In box 339, the local networked storage system 158 determines whether the update has been propagated, or replicated, successfully to the remote networked storage system 116. For example, the local networked storage system 158 may receive an acknowledgement from the remote networked storage system 116. If the update has been propagated successfully, the local networked storage system 158 moves to box 336 and returns an indication of a successful result to the client 106. Thereafter, the portion of the local networked storage system 158 ends.

If the local networked storage system 158 instead determines in box 339 that the update was not propagated successfully, the local networked storage system 158 moves from box 339 to box 342 and determines whether it is to retry sending the data. If the local networked storage system 158 is to retry sending the data, the local networked storage system 158 moves to box 345 and resends the written data object to the remote networked storage system 116. The local networked storage system 158 then returns to box 339 to verify successful propagation as described above.

If the local networked storage system 158 is not to retry sending the data, the local networked storage system 158 instead moves from box 342 to box 348 and aborts the write operation. The local networked storage system 158 may also revert the file cache 159 to an earlier state for the data object, thereby effectively undoing any previous committal of the write. In box 351, the local networked storage system 158 returns an indication of an error to the client 106. Thereafter, the portion of the local networked storage system 158 ends.

Figure 4:
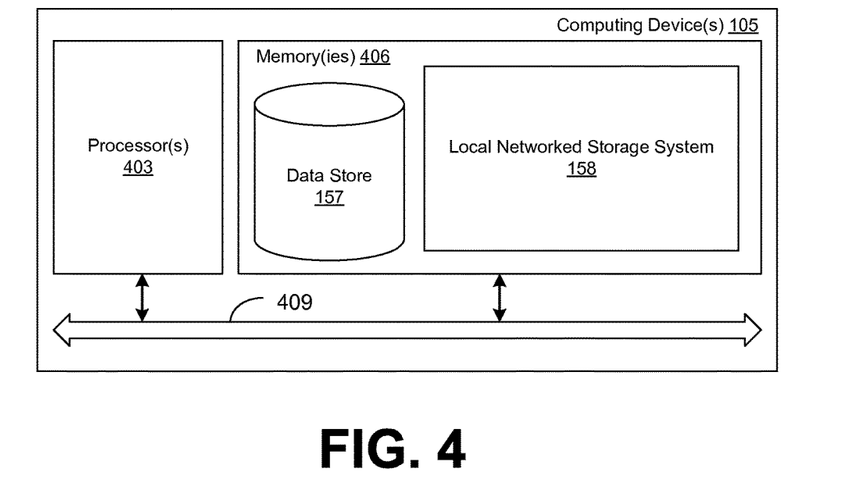
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 105 according to an embodiment of the present disclosure. The computing device 105 includes at least one processor circuit, for example, having a processor 403 and a memory 406, both of which are coupled to a local interface 409. To this end, the computing device 105 may comprise, for example, at least one server computer or like device. The local interface 409 may comprise, for example, a data bus with an accompanying address/control bus or other bus structure as can be appreciated. It is understood that the client 106 and the computing device 103 may employ processor and memory circuit architectures similar to the computing device 105.

Stored in the memory 406 are both data and several components that are executable by the processor 403. In particular, stored in the memory 406 and executable by the processor 403 is a local networked storage system 158 and potentially other applications. Also stored in the memory 406 may be a data store 157 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the local networked storage system 158, the remote networked storage system 116 (FIG. 1), the storage management application 166 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2A-3B show the functionality and operation of an implementation of portions of the storage management application 166 and the local networked storage system 158. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2A-3B show a specific order of execution, it is understood that the order of execution may differ from that which is depicted. For example, the order of execution of two or more blocks may be scrambled relative to the order shown. Also, two or more blocks shown in succession in FIGS. 2A-3B may be executed concurrently or with partial concurrence. Further, in some embodiments, one or more of the blocks shown in FIGS. 2A-3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the local networked storage system 158, the remote networked storage system 116, and the storage management application 166, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a client computing device, wherein, when executed, the program causes the client computing device to at least:
determine whether a local networked storage system is accessible to the client computing device through a local network by executing a network performance benchmark between the client computing device and the local networked storage system, the local networked storage system comprising a network-attached storage device;
render a user interface configured to facilitate storage of a file in a remote networked storage system;
obtain an indication of the file to be stored from a user through the user interface, the file being stored in the client computing device;
send the file to the local networked storage system over the local network to the network-attached storage device for storage by the local networked storage system when the local networked storage system is determined to be accessible to the client computing device through the local network;
send the file to the remote networked storage system over a remote network for storage by the remote networked storage system in a metadata-based file system managed by a user account when the local networked storage system is determined not to be accessible to the client computing device through the local network; and
wherein the local networked storage system is configured to replicate the file to the remote networked storage system managed by the user account over the remote network in response to the file being stored by the local networked storage system.

2. The non-transitory computer-readable medium of claim 1, wherein the user interface does not distinguish between files stored in both the local networked storage system and the remote networked storage system and files stored in the remote networked storage system but not the local networked storage system.

3. The non-transitory computer-readable medium of claim 1, wherein the remote network is accessed through a gateway of the local network.

4. A system, comprising:
a computing device; and
a storage management application executable in the computing device, wherein, when executed, the storage management application causes the computing device to at least:
determine whether a local networked storage system is accessible to the computing device through a local network by executing a network performance benchmark between the computing device and the local networked storage system;
send a file to the local networked storage system over the local network for storage by the local networked storage system when the local networked storage system is determined to be accessible to the computing device through the local network; and
send the file to a remote networked storage system over a remote network for storage by the remote networked storage system managed by a user account when the local networked storage system is determined not to be accessible to the computing device through the local network.

5. The system of claim 4, wherein the storage management application further causes the computing device to at least:
send a first request to read a second file to the local networked storage system over the local network when the local networked storage system is determined to be accessible to the computing device through the local network; and
send a second request to read the second file over the remote network to the remote networked storage system managed by the user account when the local networked storage system is determined not to be accessible to the computing device through the local network.

6. The system of claim 5, wherein, in response to the first request to read the second file, the local networked storage system is configured to:
return the second file to the computing device from a file cache when the second file is cached; and
obtain the second file from the remote networked storage system managed by the user account when the second file is not cached.

7. The system of claim 6, wherein the local networked storage system is configured to return the second file to the computing device and to store the second file in the file cache concurrently while the second file is being obtained from the remote networked storage system.

8. The system of claim 6, wherein the local networked storage system is configured to return the second file to the computing device after the second file is obtained from the remote networked storage system.

9. The system of claim 4, wherein the local networked storage system is configured to offer a greater quantity of data storage than a quota of the user account of the remote networked storage system.

10. The system of claim 4, wherein the remote network is the Internet.

11. The system of claim 4, wherein the local networked storage system comprises a network-attached storage device.

12. The system of claim 4, wherein the local networked storage system is configured to replicate the file to the remote networked storage system managed by the user account over the remote network in response to the file being stored by the local networked storage system.

13. The system of claim 4, wherein the storage management application further causes the computing device to at least render a user interface that is configured to obtain a user indication of whether the file is to be replicated to the remote networked storage system.

14. The system of claim 13, wherein sending the file to the local networked storage system further causes the computing device to at least:
configure the local networked storage system to replicate the file to the remote networked storage system managed by the user account when the user indication specifies that the file is to be replicated to the remote networked storage system; and configure the local networked storage system not to replicate the file to the remote networked storage system when the user indication specifies that the file is not to be replicated to the remote networked storage system.

15. A method, comprising:
determining, by a computing device, whether a local networked storage system is accessible to the computing device through a local network by executing a network performance benchmark between the computing device and the local networked storage system;
sending, by the computing device, a file to the local networked storage system over the local network for storage by the local networked storage system when the local networked storage system is determined to be accessible to the computing device through the local network; and
sending, by the computing device, the file to a remote networked storage system over a remote network for storage by the remote networked storage system managed by a user account when the local networked storage system is determined not to be accessible to the computing device through the local network.

16. The method of claim 15, further comprising:
sending, by the computing device, a first request to read a second file to the local networked storage system over the local network when the local networked storage system is determined to be accessible to the computing device through the local network; and
sending, by the computing device, a second request to read the second file over the remote network to the remote networked storage system managed by the user account when the local networked storage system is determined not to be accessible to the computing device through the local network.

17. The method of claim 16, further comprising:
in response to the first request to read the second file:
returning, by the local networked storage system, the second file to the computing device from a file cache when the second file is cached; and
obtaining, by the local networked storage system, the second file from the remote networked storage system managed by the user account when the second file is not cached.

18. The method of claim 15, further comprising offering, by the local networked storage system, a greater quantity of data storage than a quota of the user account of the remote networked storage system.

19. The method of claim 15, further comprising replicating, by the local networked storage system, the file to the remote networked storage system managed by the user account over the remote network in response to the file being stored by the local networked storage system.

20. The method of claim 15, further comprising rendering, by the computing device, a user interface that is configured to obtain a user indication of whether the file is to be replicated to the remote networked storage system.

21. The method of claim 20, wherein sending, by the computing device, the file to the local networked storage system further comprises:
configuring, by the computing device, the local networked storage system to replicate the file to the remote networked storage system managed by the user account when the user indication specifies that the file is to be replicated to the remote networked storage system; and
configuring, by the computing device, the local networked storage system not to replicate the file to the remote networked storage system when the user indication specifies that the file is not to be replicated to the remote networked storage system.

* * * * *